United States Patent
Byun et al.

(10) Patent No.: US 11,138,156 B2
(45) Date of Patent: Oct. 5, 2021

(54) CONTINUOUS DATA MANAGEMENT SYSTEM AND OPERATING METHOD THEREOF

(71) Applicant: DataCommand Corp., Seoul (KR)

(72) Inventors: Joonsuhk Byun, Seoul (KR); Jangsun Lee, Yongin (KR)

(73) Assignee: DataCommand Corp., Seoul (KR)

( * ) Notice: Subject to any disclaimer, the term of this patent is extended or adjusted under 35 U.S.C. 154(b) by 332 days.

(21) Appl. No.: 16/201,866

(22) Filed: Nov. 27, 2018

(65) Prior Publication Data

US 2019/0163765 A1 May 30, 2019

Related U.S. Application Data

(60) Provisional application No. 62/591,128, filed on Nov. 27, 2017.

(30) Foreign Application Priority Data

Apr. 2, 2018 (KR) .................. 10-2018-0038138
Nov. 13, 2018 (KR) .................. 10-2018-0139063

(51) Int. Cl.
  *G06F 16/00* (2019.01)
  *G06F 16/178* (2019.01)
  *G06F 16/11* (2019.01)
  *G06F 11/14* (2006.01)

(52) U.S. Cl.
  CPC ............ *G06F 16/178* (2019.01); *G06F 11/14* (2013.01); *G06F 16/128* (2019.01)

(58) Field of Classification Search
  None
  See application file for complete search history.

(56) References Cited

U.S. PATENT DOCUMENTS

| | | | |
|---|---|---|---|
| 8,131,723 B2* | 3/2012 | Sim-Tang | G06F 16/1873 707/737 |
| 8,352,523 B1* | 1/2013 | Sim-Tang | G06F 16/1873 707/829 |
| 8,429,362 B1* | 4/2013 | Natanzon | G06F 11/2074 711/162 |
| 8,706,694 B2* | 4/2014 | Chatterjee | G06F 16/10 707/640 |

(Continued)

FOREIGN PATENT DOCUMENTS

| KR | 101024249 B1 | 3/2011 |
|---|---|---|
| KR | 101078586 B1 | 11/2011 |
| KR | 101237746 B1 | 2/2013 |

OTHER PUBLICATIONS

Efficient Metadata Management in Block-Level CDP System for Cyber Security, Li et al., IEEE (Year: 2019).*

(Continued)

*Primary Examiner* — Jean M Corrielus

(57) ABSTRACT

An operating method of a continuous data management (CDM) system includes duplicating data of a service node in real time in units of input/output system calls and integrally managing data, based on the duplicated data, by a data management policy module. The data management policy module selects management target data among the data of the service node and sets a management policy for the selected data.

13 Claims, 13 Drawing Sheets

(56) References Cited

U.S. PATENT DOCUMENTS

| | | | |
|---|---|---|---|
| 8,712,962 B1* | 4/2014 | Natanzon | G06F 3/0641 |
| | | | 707/634 |
| 8,869,139 B2 | 10/2014 | Le et al. | |
| 8,972,347 B1* | 3/2015 | Sim-Tang | G06F 11/1435 |
| | | | 707/634 |
| 9,495,382 B2* | 11/2016 | Agrawal | G06F 11/1451 |
| 9,675,851 B2* | 6/2017 | Schweigert | A63B 53/0466 |
| 9,965,306 B1* | 5/2018 | Natanzon | G06F 11/1471 |
| 2008/0256138 A1* | 10/2008 | Sim-Tang | G06F 16/128 |
| 2011/0093471 A1* | 4/2011 | Brockway | G06F 16/313 |
| | | | 707/747 |
| 2012/0179656 A1* | 7/2012 | Bunte | G06F 11/1451 |
| | | | 707/667 |
| 2012/0265959 A1* | 10/2012 | Le | G06F 16/166 |
| | | | 711/162 |
| 2013/0179405 A1* | 7/2013 | Bunte | G06F 16/113 |
| | | | 707/673 |
| 2013/0339297 A1* | 12/2013 | Chen | G06F 16/273 |
| | | | 707/624 |
| 2015/0142745 A1* | 5/2015 | Tekade | G06F 11/1464 |
| | | | 707/646 |
| 2015/0143064 A1* | 5/2015 | Bhargava | G06F 11/1451 |
| | | | 711/162 |
| 2016/0070714 A1* | 3/2016 | D'Sa | G06F 16/1748 |
| | | | 707/692 |
| 2017/0192866 A1* | 7/2017 | Vijayan | G06F 16/27 |
| 2017/0192867 A1* | 7/2017 | Vijayan | G06F 11/2097 |
| 2017/0192868 A1* | 7/2017 | Vijayan | G06F 11/1662 |
| 2017/0193003 A1* | 7/2017 | Vijayan | G06F 3/0683 |
| 2020/0348955 A1* | 11/2020 | Meadowcroft | G06F 11/0712 |

OTHER PUBLICATIONS

A novel block-level continuous data protection system, Yibing et al., IEEE (Year: 2010).*

* cited by examiner

CONTINUOUS DATA MANAGEMENT SYSTEM AND OPERATING METHOD THEREOF

CROSS-REFERENCE TO RELATED APPLICATIONS

This application claims the benefit of U.S. Provisional Application No. 62/591,128, filed on Nov. 27, 2017 and priority under 35 USC § 119 to Korean Patent Application Nos. 10-2018-0038138, and 10-2018-0139063, filed on Apr. 2, 2018 and Nov. 13, 2018, respectively, the entirety of which are hereby incorporated by reference.

TECHNICAL FIELD

Embodiments of the present disclosure relate to continuous data management system and method. More specifically, embodiments of the present disclosure relate to an integrated data management system receiving changed data of a service node in real time to provide "data always-available" without applying a load, required for data management, to a service node.

BACKGROUND

With the arrival of the data-driven age represented by artificial intelligence (AI), Internet of things (IoT), Big Data, and genome analysis along with utilization of various information technology (IT) service environments such as a cloud and a hyper-converged infrastructure (HCI), various types of data are explosively increasing and data dependency of IT services is growing day by day.

According to the 2014 Global IT Study presentation, corporate losses caused by data loss and service downtime amounted to about 2,000 trillion won per year and a growth rate of data loss was 400% from 2012 to 2014. Even a certain case, business bankruptcy occurred. Such a trend is expected to be intensified due to the explosive growth in data. Accordingly, data should be managed to be always available for non-disruptive business service, which is a matter of business survival.

To provide "data always available" is an ultimate goal of data management. To achieve the goal, most market leader enterprises in a data management field have developed and provided various products depending on purposes of data management. However, most of the products are merely stopgap solutions such as adding necessary functions to existing products rather than addressing fundamental issues of the existing products. As a result, enterprises have purchased and operated various products according to needs thereof such as data backup/recovery, disaster recovery (DR), and the like for important data management. Thus, a data management environment is becoming complex, resulting in increasing difficulty in managing IT service environment and data. Nevertheless, the fundamental issues of the existing product are not addressed and the "data always available" is not provided.

In the existing data management field, market leader products were mainly tape-based data backup/recovery products. In addition, subsequently developed products of other purposes were also rooted in tape-based technology. Most tape-based market leader products were older than 30 years and have been maintained only by adding new functions according to requests without change of core technology. Therefore, product codes are so huge and old that it is difficult to keep pace with new requirements and changes in terms of performance as well as functionality.

According to the End-User Survey conducted by IDC in 2016 for enterprises adapting and using traditional data management products, there was a common complaint that it was difficult to provide "data always available" because data management operations were complex and difficult, operation time was too long, a storage required for data management was excessive, and data recovery was unstable. That is, the existing data management technology has reached a limitation thereof. In addition, an integrated data management technology for a data-driven era should be developed to satisfy the requirements as follows: (1) data management to ensure 24×365 service while separate time for data management is not given, (2) data management to significantly reduce degradation in service, (3) data management capable of significantly reducing data loss and recovery time, (4) data management capable of protecting and recovering data from randsomware or the like, (5) data management to significantly reduce creation of a separate copy of data, which should be provided according to needs of application services such as test, data analysis, and the like, to improve efficiency of a storage space, (6) data management capable of performing point-in-time recovery in units of $1/1,000$ second, and (7) simple, automated, and integrated data management (removal of a complex and high-priced data management infrastructure which should various products under a viewpoint of data management).

SUMMARY

The present disclosure provides a continuous data management (CDM) system which provide "data always-available" to ensure 24×365 service, while minimizing an influence on a service node, and methods to achieve an automated and integrated data management.

A continuous data management (CDM) system according to an example embodiment of the present disclosure may duplicate data of a service node in real time, in units of input/output system calls, and may integrally manage data based on the duplicated data. Real-time data duplication technology may include data management capable of ensuring 24×365 service, data management capable of minimizing service degradation, and data management capable of minimizing data loss and recovery time.

Integrated data management technology may include data management capable of minimizing data loss and recovery time without affecting service nodes, data management capable of performing data analysis work without copying real data, data management capable of protecting and recovering data from ransom ware, and data management capable of minimizing creation of a separate data copy, which should be provided according to the needs of application services such as test, data analysis, data backup, and so on. Integrated data management technology maximizes the efficiency of storage space, and provides methods to manage data integrally with only one continuous data management system instead of using many products accruing to the purpose of data management such as, data backup and recovery, CDP, data replication, and so on.

An operating method of a continuous data management (CDM) system according to an example embodiment of the present disclosure includes duplicating data of a service node in real time in units of input/output system calls and integrally managing data, based on the duplicated data, by a data management policy module. The data management policy module selects management target data among the data of the service node and sets a management policy for the selected data.

BRIEF DESCRIPTION OF THE DRAWINGS

The above and other aspects, features, and advantages of example embodiments of the present disclosure will be more apparent from the following detailed description taken in conjunction with the accompanying drawings, in which.

DETAILED DESCRIPTION

Figure 1:
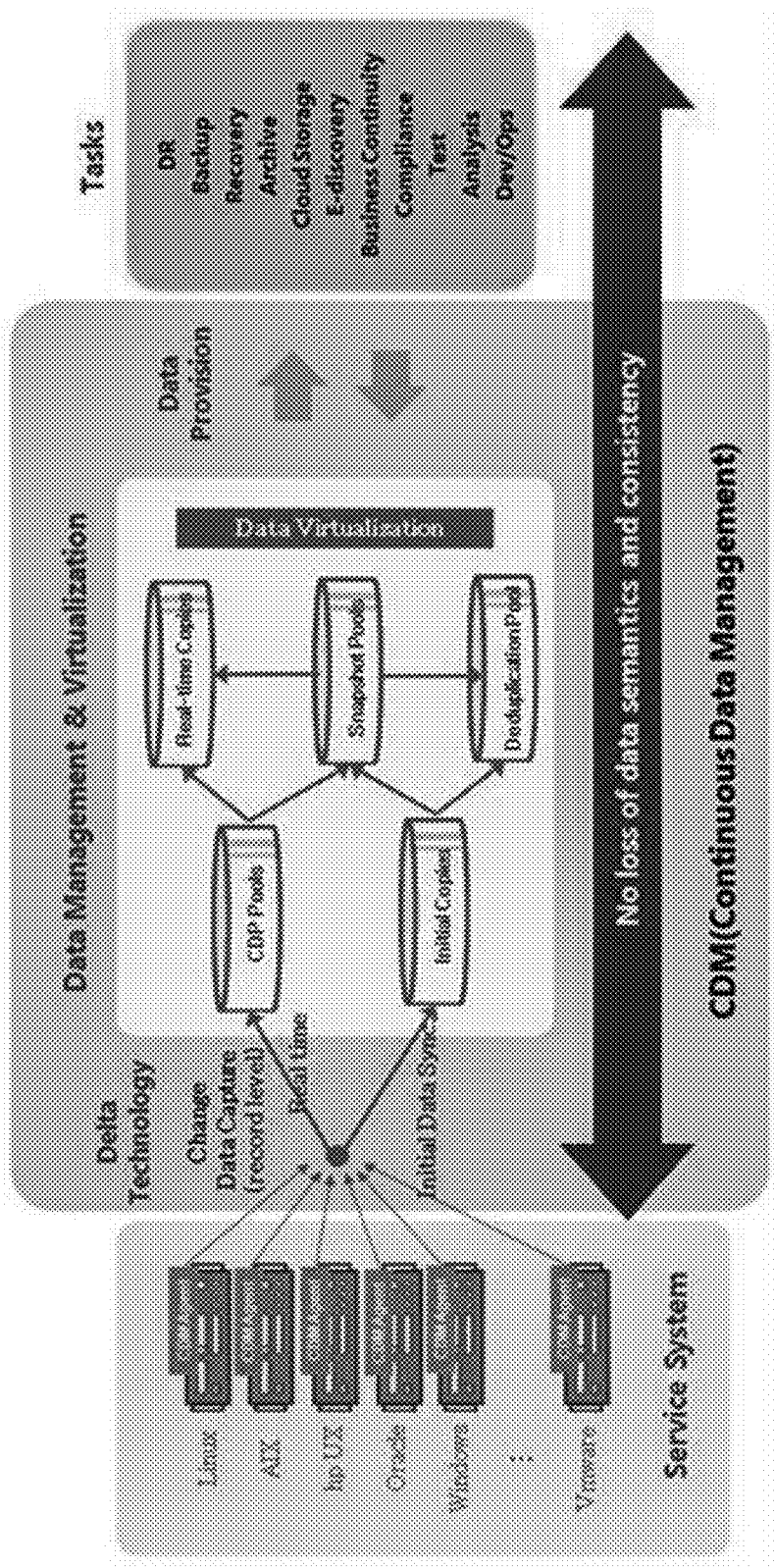
FIG. 1 illustrates a CDM system structure from the viewpoint of data flow.

The advantages and features of the present disclosure and methods of achieving them will be apparent from the following exemplary embodiments that will be described in more detail with reference to the accompanying drawings. It should be noted, however, that the present disclosure is not limited to the following exemplary embodiments, and may be implemented in various forms. Accordingly, the exemplary embodiments are provided only to disclose the present disclosure and let those skilled in the art know the category of the present disclosure.

In the specification, it will be understood that when an element is referred to as being "on" another layer or substrate, it can be directly on the other element, or intervening elements may also be present. In the drawings, thicknesses of elements are exaggerated for clarity of illustration.

Exemplary embodiments of the invention will be described below with reference to cross-sectional views, which are exemplary drawings of the invention. The exemplary drawings may be changed by manufacturing techniques and/or tolerances. Accordingly, the exemplary embodiments of the invention are not limited to specific configurations shown in the drawings, and include modifications based on the method of manufacturing the semiconductor device. For example, an etched region shown at a right angle may be formed in a rounded shape or formed to have a predetermined curvature. Therefore, regions shown in the drawings have schematic characteristics. In addition, the shapes of the regions shown in the drawings exemplify specific shapes of regions in an element, and do not limit the invention. Though terms like a first, a second, and a third are used to describe various elements in various embodiments of the present disclosure, the elements are not limited to these terms. These terms are used only to tell one element from another element. An embodiment described and exemplified herein includes a complementary embodiment thereof.

The terms used in the specification are for the purpose of describing particular embodiments only and are not intended to be limiting of the invention. As used in the specification, the singular forms "a", "an" and "the" are intended to include the plural forms as well, unless the context clearly indicates otherwise. It will be further understood that the terms "comprises" and/or "comprising", when used in the specification, specify the presence of stated features, integers, steps, operations, elements, and/or components, but do not preclude the presence or addition of one or more other features, integers, steps, operations, elements, components, and/or groups thereof.

The present disclosure will now be described more fully hereinafter with reference to accompanying drawing, in which example embodiments of the present disclosure are shown.

Embodiments of the present disclosure provide a technology to duplicate data of a service node in real time and automatically and integrally manage data, based on the duplicated data, without affecting the service node according to a policy determined by a user.

Real-time data duplication is a starting point to make "data always available" in a situation where enough time for data management is not given. In order to duplicate data in real time, all I/O operations along the entire life cycle of data, such as creating/updating data and deleting the data, should be traced and managed. If we can extract the information associated with the data stored on a storage by tracing data input/output related system calls in real time, the entire data life cycle can be managed. In the present disclosure, to trace all I/O system calls and then extract the information including the data, we utilize a technology disclosed in Korean Patent Registration No. 10-1024249. The above patented technology capable of tracing the entire data life cycle will be hereinafter referred to as "delta technology".

In the present disclosure, a CDM system is connected to service nodes through a network; the configuration manager of a CDM system lists all service nodes and allow users to register the service nodes should be managed. Then, the data management policy module of a CDM system provides a means capable of selecting the data which needs to be managed among data of the service nodes and capable of setting management policies for the data. The CDM system carries out automated and comprehensive data management without affecting a service node according to the policies without an additional product or configuration such as data backup, replication, DR, and so on.

After setting the data management policies for each service node through the above process, the CDM system starts the data management service from initial synchronization of the data of the service node with the CDM system. In this case, the initial synchronization of the data of the service node is performed most efficiently in a state in which the service is not stopped, that is, in an online state.

A CDM agent installed on a service node creates a directory snapshot of the service node to synchronize the data of the service node initially. The directory snapshot includes a directory structure for data files of the service node and hard links of the files included in each directory. Then, the CDM agent transmits the directory structural information to the CDM system, scans all hard links included in the snapshot to generate a storage extent/block map of the service node mapped to a logical address of all file data, and then transmits the mapping information to the CDM system after aligning the map based on a physical address.

The CDM agent reads data stored in the extent/block in the order in which they are aligned based on the physical address, and transmits the data to the CDM system, which can significantly reduce the time for synchronizing the data should be managed. A master copy module of the CDM system generates the same directory structure of the data transmitted by the CDM agent, and replicates the extent/block data transmitted by the CDM agent on top of the structure using the mapping information.

Since the initial synchronization of data is performed while a service node operations continue, changes in a file system structure or data of the service node may occur during the synchronization. The changes are traced and recorded by the delta technology simultaneously with the initial synchronization. The CDM agent transmits all data change history traced by the delta technology to the CDM system while performing the initial synchronization process. The transmitted data change history is separately managed in a CDP pool by a CDP module of the CDM system. After the initial synchronization is primarily completed, a snapshot module of the CDM system reflects a CDP log record stored in the CDP pool on the primarily synchronized data to complete the initial synchronization. The initially synchronized data is managed by a master copy module of a CDM system and is referred to as initial copy.

Then, the CDM agent transmits the changed data in the service node to the CDM system in real time, and the transmitted data is separately managed by the CDP module without being reflected on the initial copy (see FIG. 1).

The CDP module logs data transmitted from a service node file by file in a CDP pool in units of input/output system calls in the form of a journal, by adding the time each system call occurred. The CDP module manages all data change history and restores the data at point in time a user requires in various units for a short period of time. In addition to management of the changed data in the form of a journal, the CDP module separately manages changed file and directory information to be used as basic information for data virtualization and snapshot cleanup.

Since the CDP module should store all data change history in the CDP pool after the service node data is initially synchronized, a great amount of CDP pool is required. Therefore, it is impossible to store and manage the data change history in the CDP pool for infinite time; only the data change history for a certain period of time is stored and managed based on the data management policy. That is, when a predetermined time elapses, the data stored in the CDP pool should be cleared by synthesizing the data and separately managed.

After CDP period defined by a data management policy, the data stored in the CDP pool is synthesized file by file. The data is synthesized based on the most currently changed data. The synthesized data through such a process is referred to as snapshot data, and the snapshot module serves to create a snapshot.

The data stored in the CDP pool is not the data stored in a storage of the service node but data obtained by recording the data change history in units of input/output system calls. All snapshots generated by the snapshot module maintain consistency of the data. Nevertheless, the snapshot module transmits a snapshot generation signal to the CDM agent for an application, requiring a special action, to maintaining the consistency of data. After allowing an application of the service node to take a proper action, the CDM agent may transmit a signal to generate a snapshot to the snapshot module. The action taken by the CDM agent is merely an act to freeze an application state and has little impact on the application. That is, it is no need to store cached data on a storage because of the delta technology which catches the data in memory.

Figure 2:
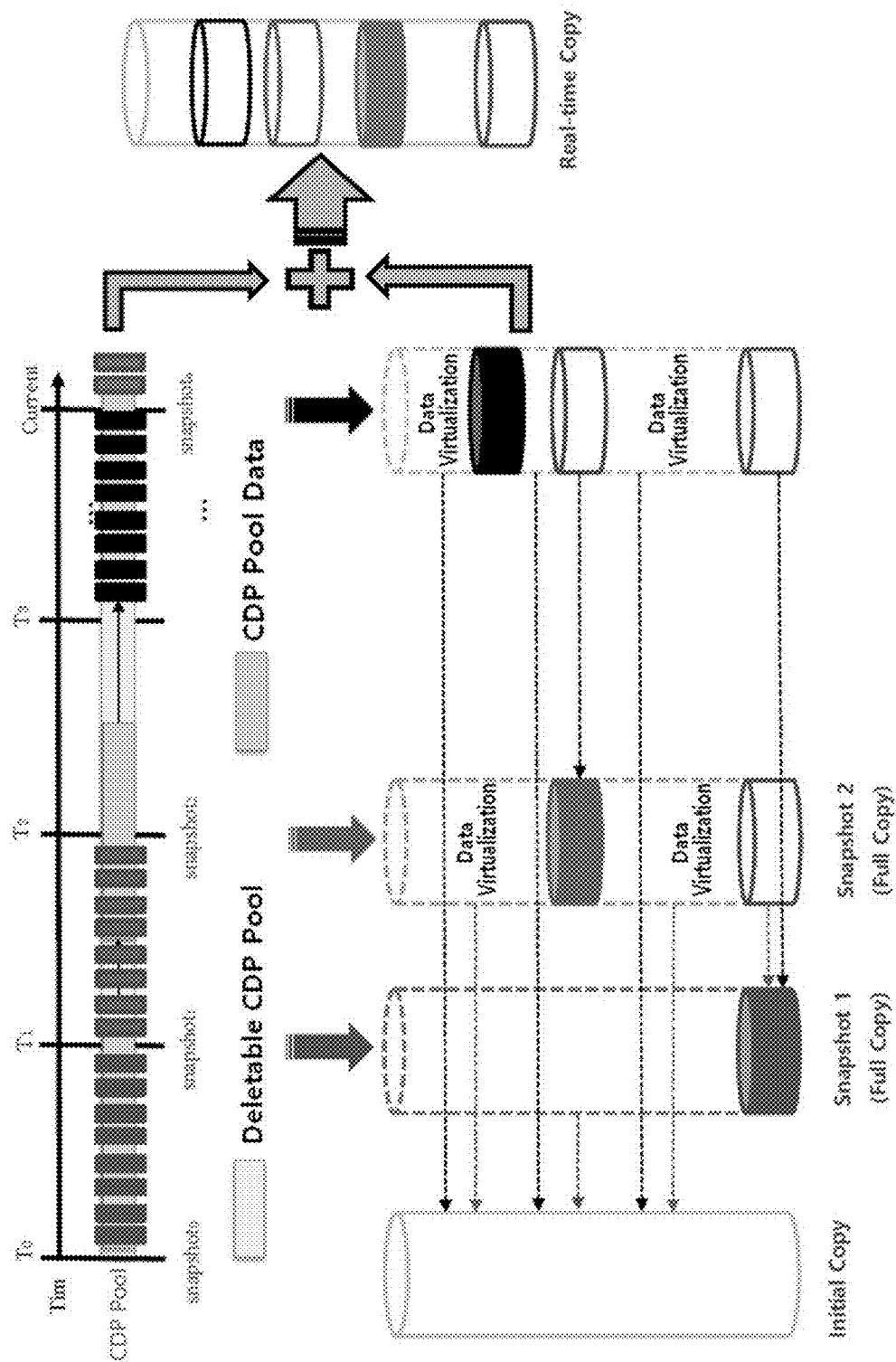
FIG. 2 illustrates an integrated data management structure of a CDM system.

The data stored in the CDP pool is synthesized as a snapshot data periodically, but, to ensure the CDP policy, the data in the CDP pool is gradually deleted from the CDP pool, as shown in FIG. 2, instead of removing all data form the CDP poll at once.

The Snapshot module shares a file and directory information generated by the CDP module with a master copy module and a data virtualization module. The mater copy module uses this information to clean up a snapshot. The data virtualization module uses this information to generate metadata required for data virtualization and a structure required for snapshot creation by replicating the directory structure from an initial copy in the case of a first-created snapshot after creation of the initial copy and from a finally-created snapshot in the case of a subsequently crated snapshot. The directory includes a directory entry which roughly consists of an entry name and an inode. Thus, duplicating a directory structure is identical to duplicating directory entries.

Then, the snapshot module completes a snapshot creation by storing the snapshot data on a newly created snapshot structure generated by the data virtualization module. The snapshot module transfers the information of the newly created snapshot to the master copy module, and then the master copy module manages the snapshot as a full copy of the service node at an arbitrary point in time.

The snapshot created by the above-described method includes only the data stored in the CDP pool physically, but the other data may be accessed through the metadata of a replicated snapshot. Accordingly, the snapshot created by the CDM system is an independent full copy which is identical to a full copy of a service node data at the time when the snapshot is created. That is, the CDM system physically stores only a single copy of the service nodes, but it provides point in time full copy data of service nodes without affecting the service nodes and replicating real data (see FIG. 2).

The master copy module registers and manages all snapshots created by the snapshot module as well as the initial copy. That is, the master copy module provides point in time full copy data of service nodes when a user requests for. For example, when a service node fails, the master copy module may create and provide a full copy of the service node data immediately just before the failure of the service node. To this end, the master copy module requests the snapshot module to create a new snapshot and deliver the snapshot information as a result. The snapshot module synthesizes the snapshot data with the logs journaled in the CDP pool until just before the failure of the service node. It creates a snapshot with a data virtualization module by the method described above, and delivers the information to the master copy module.

The snapshot created above is a full copy of the data just before the failure of the service node and is referred to as a real-time copy (see FIG. 2). The master copy module provides a way to mount the real-time copy directly from another node. The master copy module can also restore the real-time copy to a storage a user wants to. Besides, the master copy module provides point-in-time full copy data in the same way above mentioned for testing, analysis and so on without coping real data. In this case, the changed data may be managed using the same method as described above.

As the data stored in the CDP pool should be deleted according to a policy, the snapshots managed by the master copy module cannot be kept for an infinite time. Therefore, some snapshots should be deleted according to the policy when a certain period of time elapses.

The master copy module uses a file and directory information generated by the CDP module when cleaning up and deleting a snapshot. That is, files and a directories included in the information refer to changed data until the snapshot was created. The other files and directories not included in the information mean unchanged data, which is just shared with a previous snapshot. Accordingly, actual data and metadata corresponding to the immediately previous snapshot can be deleted using file and the directory change information, while only the metadata, but not real data, related to files and directories, which are not included in the information, can be deleted from the immediately previous snapshot.

The CDM system may significantly reduce the amount of transmitted or replicated data through elimination of data duplication when the data stored in the internal storage needs to be managed or utilized for a long period of time. In this case, a deduplication pool is used. Data deduplication starts with initial copy and supports both a fixed-sized chunk manner and a variable-sized chunk manner.

Deduplicated data roughly includes metadata and actual data. The metadata includes an information storage, including directory information, file information, hash values of a file data chunks, and a hash table providing information on a data chunk indicated by a hash value. Data stored in the deduplication pool is the metadata, and the actual data is stored in a chunk repository.

A snapshot managed by the master copy module is full copy data at an arbitrary point in time. The CDM system may provide a full copy at a desired point in time by simply replicating a snapshot, without replicating actual the data, depending on a purpose of a test or analysis according to a user's request.

Figure 3:
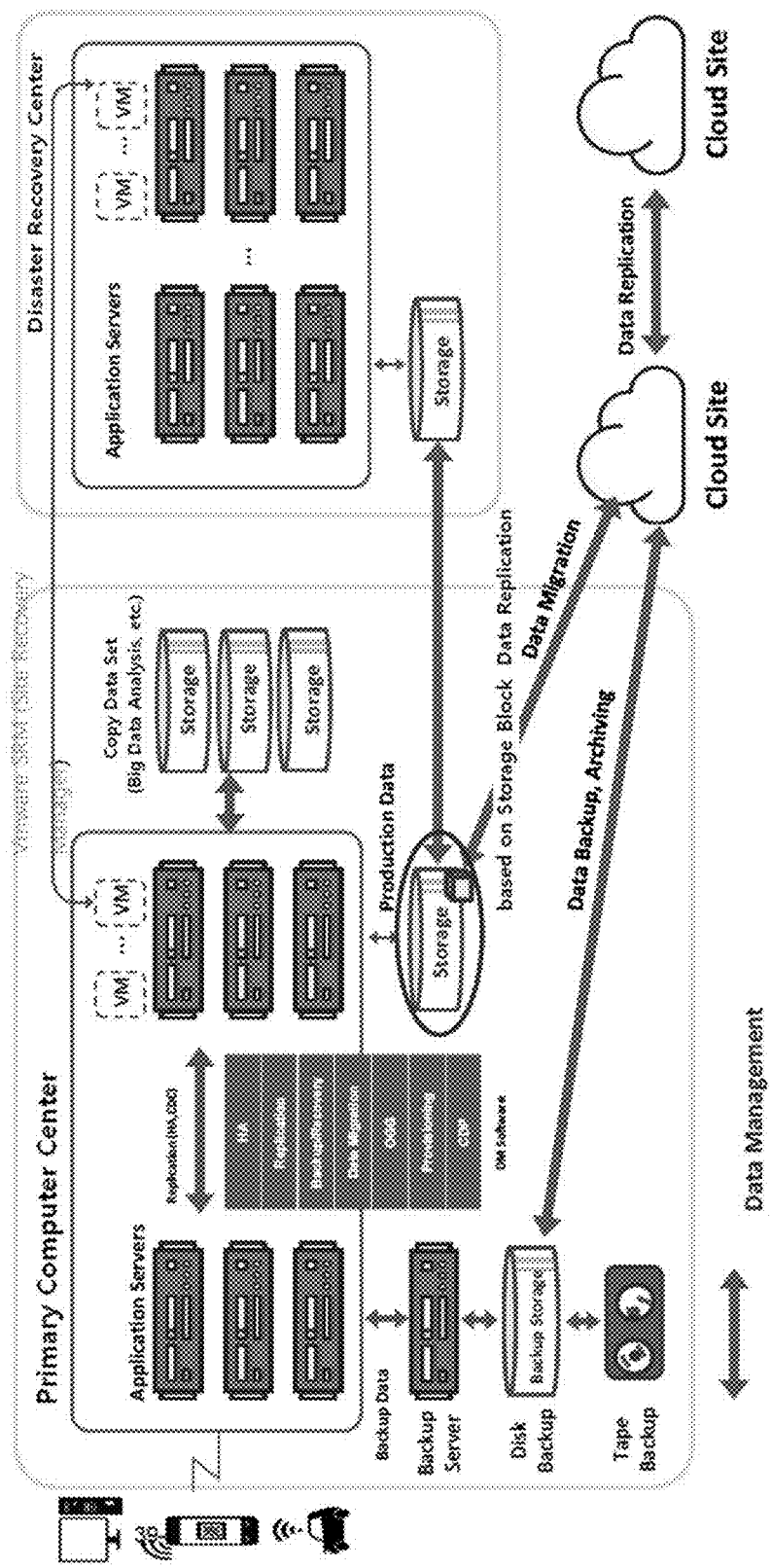
FIG. 3 is a typical data management structure diagram.

FIG. 3 schematically illustrates a typical deployment of a current data center. It can be seen that various products such as data replication, backup/recovery, and CDP products are installed and operated complexly to provide data availability. Nevertheless, due to the storage-centric data management, it is difficult to provide "data always available", and actual data is replicated according to the needs such as test and analysis so that enormous amount of storage is required.

Figure 4:
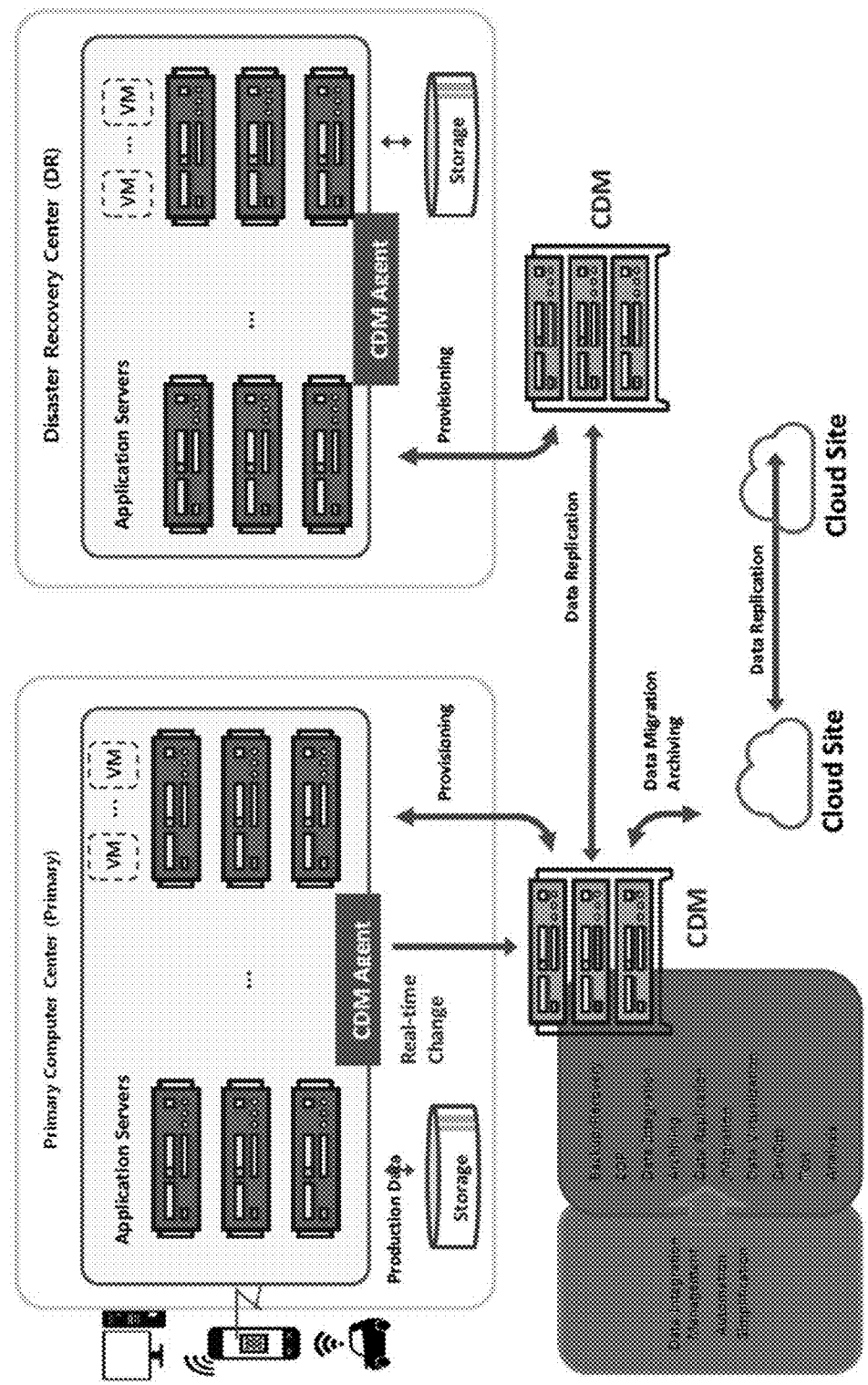
FIG. 4 is a data management structure diagram when a CDM system is applied.

FIG. 4 schematically illustrates a deployment type of a data center when the CDM system is applied. The module mounted on the service node is simply a CDM agent and it is possible to provide an automated and integrated data management without installing other data management software and provide data without duplication of actual data according to the needs for test, analysis, and something like that.

Schematic Operation of CDM System

In the present disclosure, a delta technology disclosed in Korean Patent Registration No. 10-1024249 is used as a technology for tracking the entire data life cycle.

Figure 5:
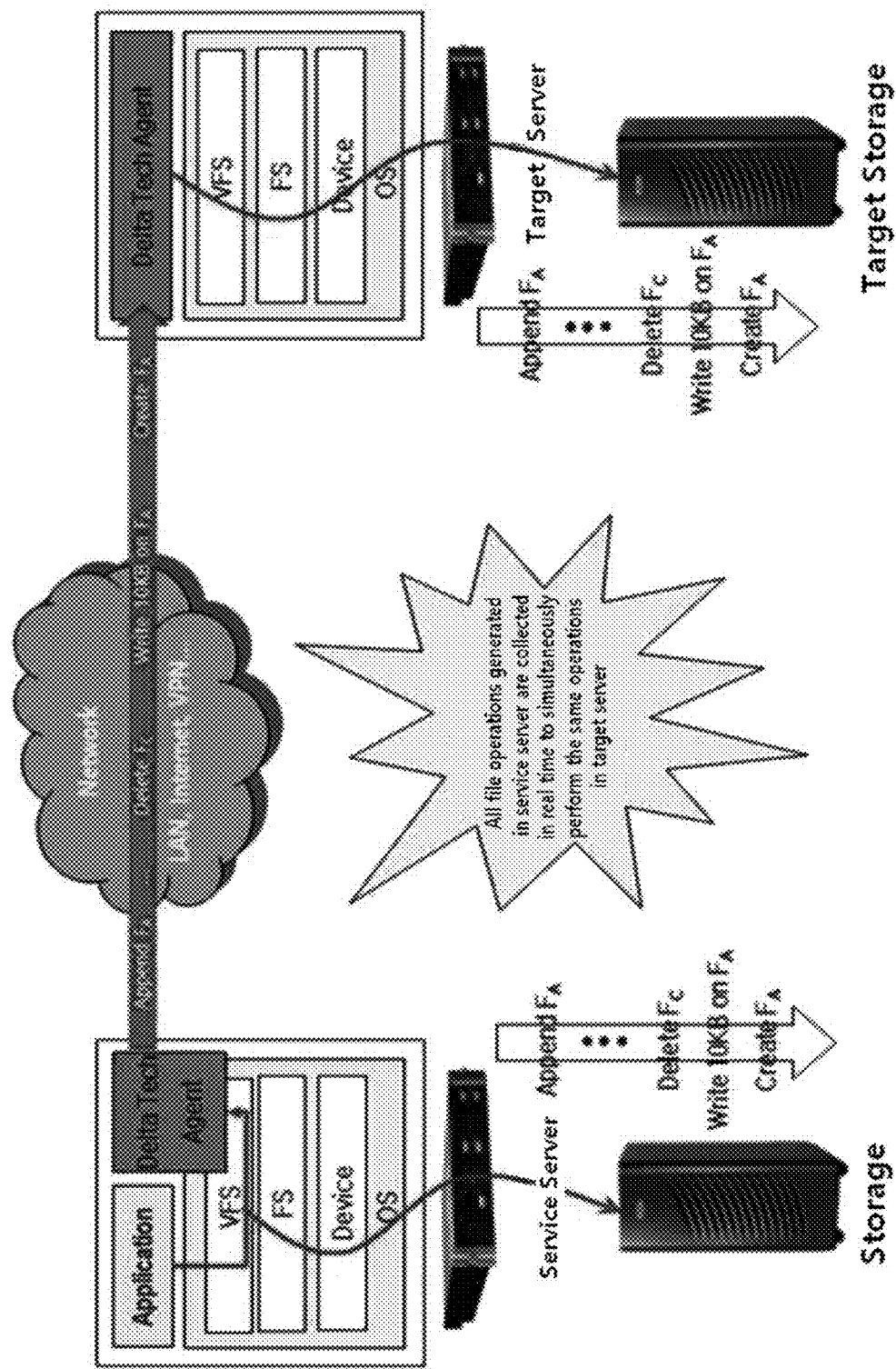
FIG. 5 illustrates a real-time data replication method in units of input/output system calls.

FIG. 5 is a conceptual diagram of real-time data duplication (replication) based on Delta Technology. All information for managing the entire data life cycle may be extracted by hooking input/output related systems calls provided by an operating system in a VFS layer. Referring to FIG. 5, by applying the delta technology, input/output related system calls are hooked to extract necessary information to replicate data, and the information is transmitted to a remote node; the system calls are reexecuted in a remote node to replicate the data.

That is, necessary input/output system calls are hooked in the VFS layer of the operating system to extract not only the data to be duplicated but also all information to perform the system calls; the data and information are transmitted to a remote node. The remote node replicates data by executing system calls corresponding to the original system calls based on the extracted information.

CDP Technology Based on Delta Technology

Figure 6:
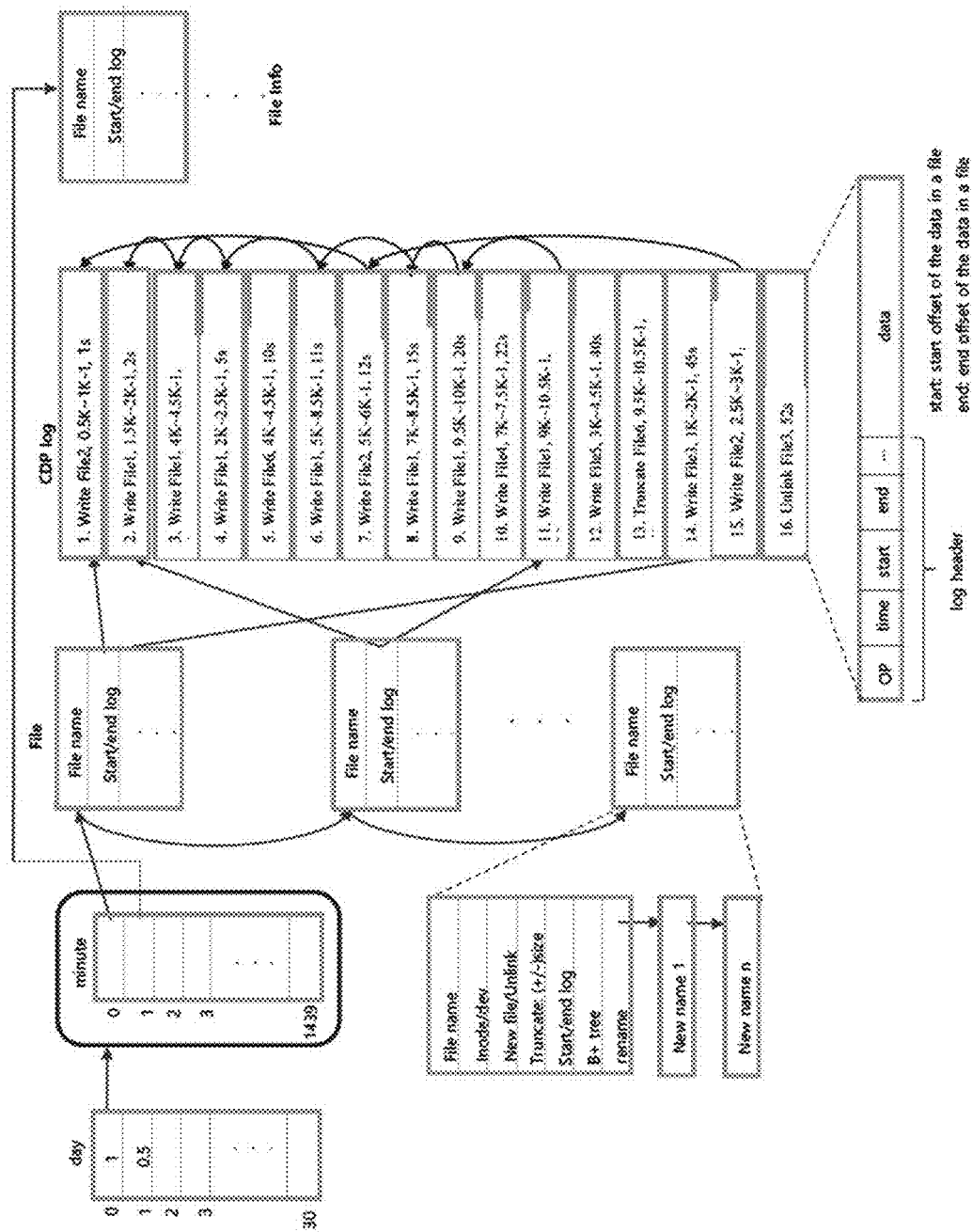
FIG. 6 illustrates a data structure for providing CDP functions in a CDP pool.

In the present disclosure, after creating an initial copy, the CDM system stores input/output data and system call information, transmitted by a CDM agent of a service node using the above method, in a CDP pool in the form of a log after adding the time information on a per-system call basis to enable recover data in a system call unit. FIG. 6 illustrates a data structure for CDP implementation after an initial copy is created. In FIG. 6, a single CDP log record is composed of a log header and actual data. The log header includes the system call information transmitted by the CDM agent, such as, file information, operation type, actual data and the information on the actual data, and the time at which the operation is performed. The CDP module saves the CDP log record in minutes and stores it in the CDP pool. The operation performed in the service node is reproduced by tracing the logs file by file to recover data in a system call unit or generate service node data at the time a user wants to recover.

In FIG. 6, file information (File Info) includes information on a file stored in the CDP log. This information is used in the process of data virtualization as well as creating and cleaning up a snapshot. CDP log records for the same file are all connected in reverse order of time.

Figure 7:
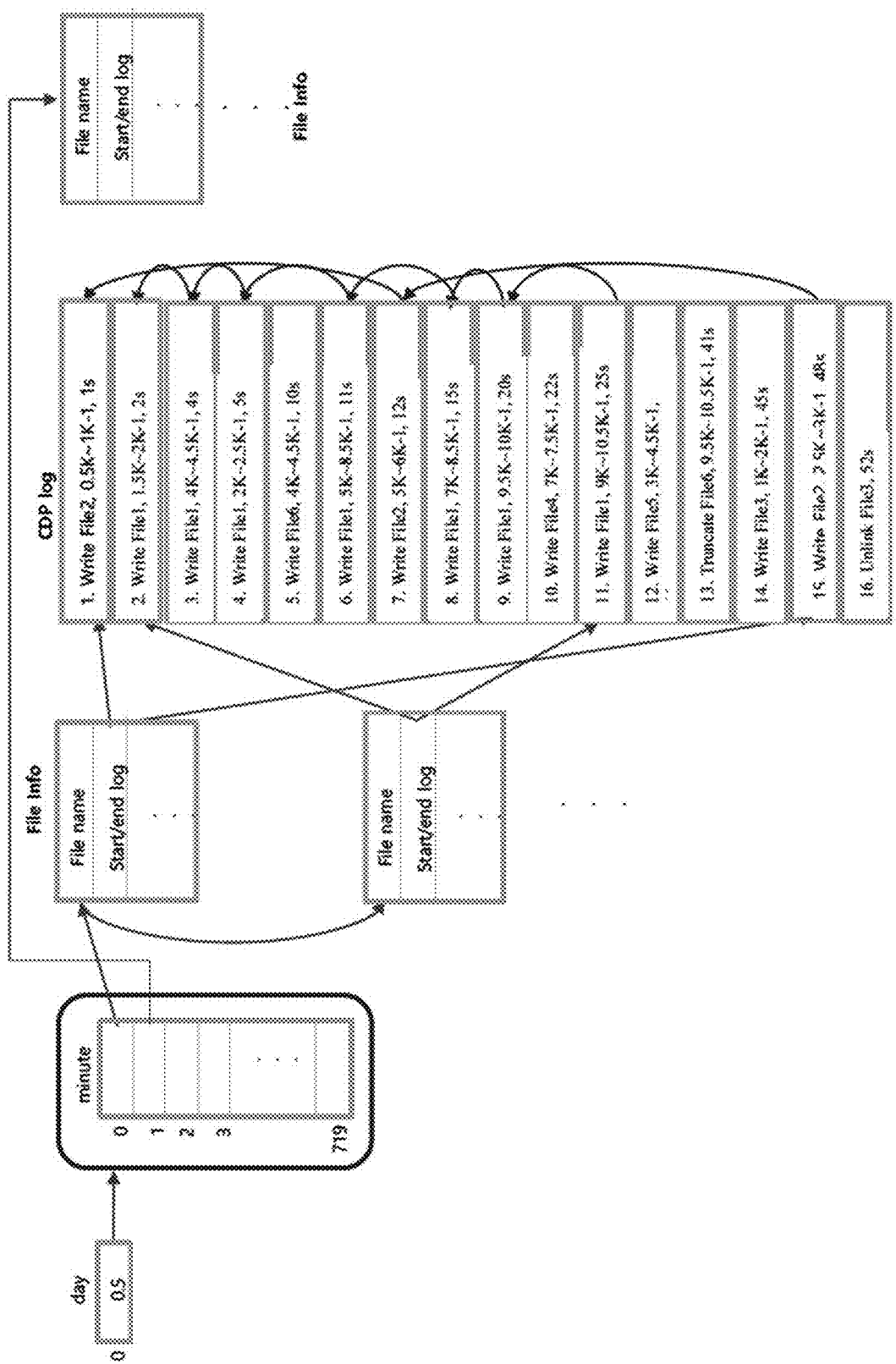
FIG. 7 illustrates a data structure for a 12-hour period CDP.

CDP requirement time is represented by day and minute structures, which may be connected to the File Info to implement CDP functions of necessary time. For example, when CDP time of 12 hours is set, a data structure stored in the CDP pool may be shown in FIG. 7. When a user wants to restore data at 0 minute and 12 seconds of File 2, the CDM system finds File Info for File 2 among the File Info indicated by day and minute of the CDP pool and tracks and follows from an end log indicated by the File Info up to CDP log record of desired time. A last CDP log record for File 2 in FIG. 7 is a 15th record. However, since time of the 15th record is data at 0 minutes and 48 seconds, it can be seen that a 7th record, previous CDP log record, is desired data.

Data of 0 minutes and 12 seconds of File 2 refers to all data of File 2 changed by 0 minutes and 12 seconds. Therefore, it can be restored simply by executing the write operations recorded in the log from the first CDP log record of File 2 to the CDP log record 7 sequentially on the last generated snapshot.

Another method is synthesizing operations to perform only a required operation rather than individually performing operations of a CDP log record. That is, all operations for File 2 recorded before the seventh CDP log record may be combined with the seventh record to restore data on File 2 changed by 0 minutes 12 seconds. Entire File 2 data is restored by finally synthesizing File 2 data stored in a last created snapshot and data synthesized in the above CDP log record.

CDP Log Record Synthesis Technology

Snapshot data is generated by reflecting a type of operation for each file of a CDP log record stored in minutes. For example, when a last log record for a certain file is a delete operation, it is unnecessary to process the other log records for the file.

Among operations for a file, an operation needed to synthesize is a write-related operation, and it is synthesized by applying a B+ tree. Write operations for a certain file use start and end points of data in the file as a key of the B+ tree in such a manner that only non-overlapping data portions may be included in the snapshot data. That is, a changed area of the file is used as a key, and every key is checked whether there are portions overlapping the already inserted keys. If there are overlapping portions, the other ranges except the overlapping portions are adjusted as new keys and inserted. In the process of inserting the newly adjusted key, it is checked whether there are portions overlapping the already inserted keys repeatedly in the same way as described above.

Finally, when the adjusted key is inserted into a leaf node of the B+ tree, if the already inserted range and the newly inserted range are contiguous, the two keys are merged into a new key, and the already inserted key is replaced by the new key. In this case, the chunk information is also adjusted.

For example, in FIG. 7, synthesis for File 1 for zero to one minute is performed from inserting a data area in an eleventh (last) log record of File 1, that is, the start and end points (9K and 10.5K−1) in the B+ tree as a key. It will be assumed that an order of the B+ tree is 3. Each entry inserted into the leaf node of the B+ tree consists of the location information in the file of the data in the CDP log and the information on data chunks synthesized among the data in the CDP log (see FIG. 8).

Then, a synthesis target is a ninth log record and a key thereof is (9K, 10K−1). Since an area of the key (9K, 10K−1) completely overlap an area of a previously inserted key (9K, 10K−1), the key (9K, 10K−1) does not need to be inserted into the B+ tree. That is, the data in the eleventh log record is the one written last in (9K, 10K−1) range of File 1, and since the range of the data in the ninth log record is completely overlapped with that of the eleventh log record, the ninth log record should be ignored.

The eighth log record is the next one to be synthesized and the key is (7K, 8.5K−1). There is no overlapping range with the keys previously inserted, so the key is inserted in B+ tree. The key (5K, 8.5K−1) of the sixth log record is partially overlapped with the key (7K, 8.5K−1) previously inserted. Therefore the key should be adjusted so that the remaining range except overlapping range can be inserted. That is, the key should be adjusted as (5K, 7K−1) and inserted.

It can be seen that when the adjusted key (5K, 7K−1) is inserted into the leaf node, the area is contiguous with the already inserted key (7K, 8.5K−1) of the eighth log record. In this case, the two keys are merged into a new key (5K, 8.5K−1) and replaced the originally inserted key with the new key. Then the chunk information is also adjusted and inserted into the proper position.

Figure 8:
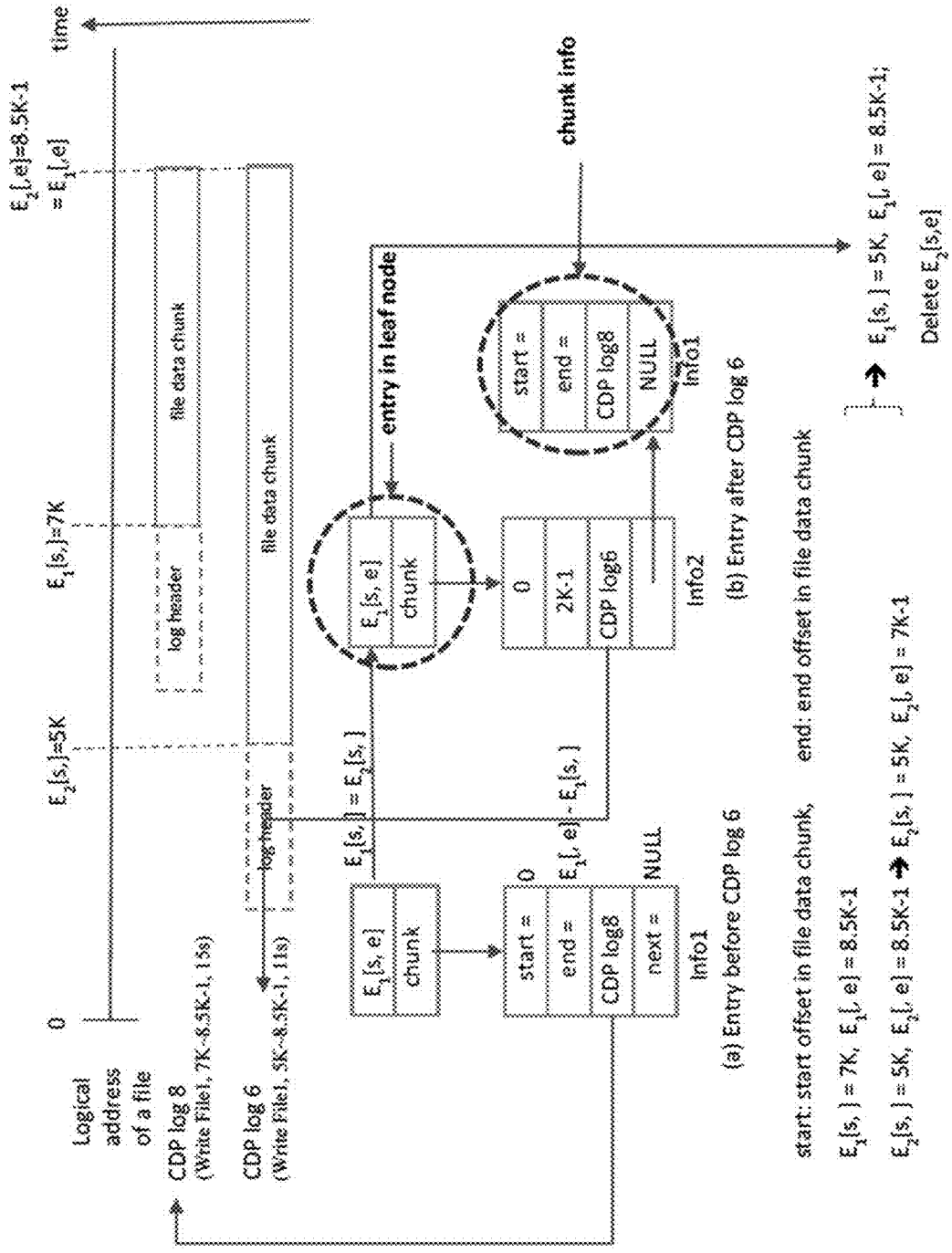
FIG. 8 illustrates CDP log record synthesis.

FIG. 8(a) illustrates a state before synthesis of the sixth CDP log record, and FIG. 8(b) illustrates a state after synthesis thereof. The range of the file data chunk to be synthesized of the sixth CDP log record is (5K, 8.5K−1), but the portion (7K, 8.5K−1) overlapping with the eighth log record data should be excluded. As a result, the range of the data chunk to be synthesized should be adjusted as (5K, 7K−1), and the chunk information is also adjusted accordingly (see info2 in FIG. 8). In this case, two synthesized ranges are contiguous in a file although the actual data chunk are present in CDP log records separately. Accordingly, the original eighth CDP log entry is adjusted and new chunk information is connected according to a logical address of the file before the original chunk information (see FIG. 8(b)).

Figure 9:
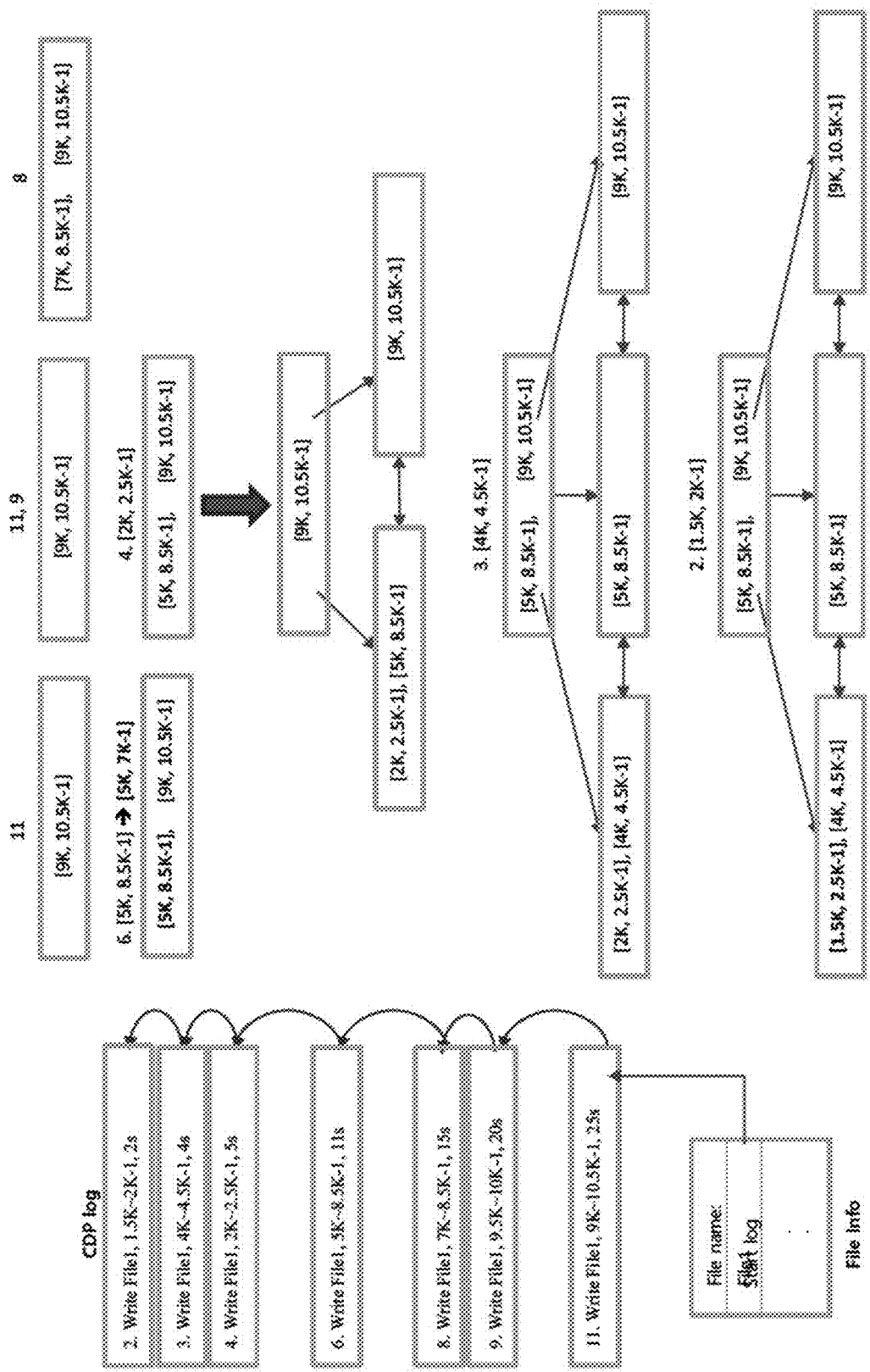
FIG. 9 illustrates a result of CDP log record synthesis using a range-based B+ tree.

If the range of the file data chunk of the sixth CDP log record is not overlapped with other keys, it should be inserted into the B+ tree as it is. However, since there is no more insertion space in a target leaf node, the leaf node should be divided by the B+ tree node insertion algorithm. This result is shown in FIG. 9.

Through the above-described procedure, all the CDP log records may be synthesized in minutes to create single snapshot data and may be processed for each file in parallel to optimize synthetic time.

To sum up, in the present disclosure, a conventional B+ tree is used to synthesize all CDP log records but, unlike the conventional B+ tree, a key is a not a single value, but the range representing the location of a data chunk in a file, so that there should be means to process overlapping ranges.

Snapshoot Creation Technology

The snapshot module requests the data virtualization module to create a structure required to create a snapshot before synthesizing CDP log records for each file. The data virtualization module creates the structure required to create a snapshot by replicating the directory structure from the topmost directory of an initial copy or the last created snapshot when if a snapshot is created for the first time after initial copy or there is a snapshot, respectively. In general, a directory includes a directory entry, which roughly consists of an entry name and an inode. Accordingly, replicating a directory structure is identical to replicating directory entries of the directory.

The data virtualization module replicates all directory entries one by one using the file and directory information generated by the CDP module. While replicating directory entries, if an entry name of a directory entry is the same as the above file and directory information, it means some operations for the entry occurred during a CDP period. That is, since the case means that the file or directory has been changed, a new inode is generated to replace the original entry. Thus, the original entry is protected and new metadata is generated to store the changed data.

An opposite case means that no operation for the entry has occurred during the CDP period, and the entry is replicated as it is such that data may be accessed without replicating actual data in a snapshot generated now.

Figure 10:
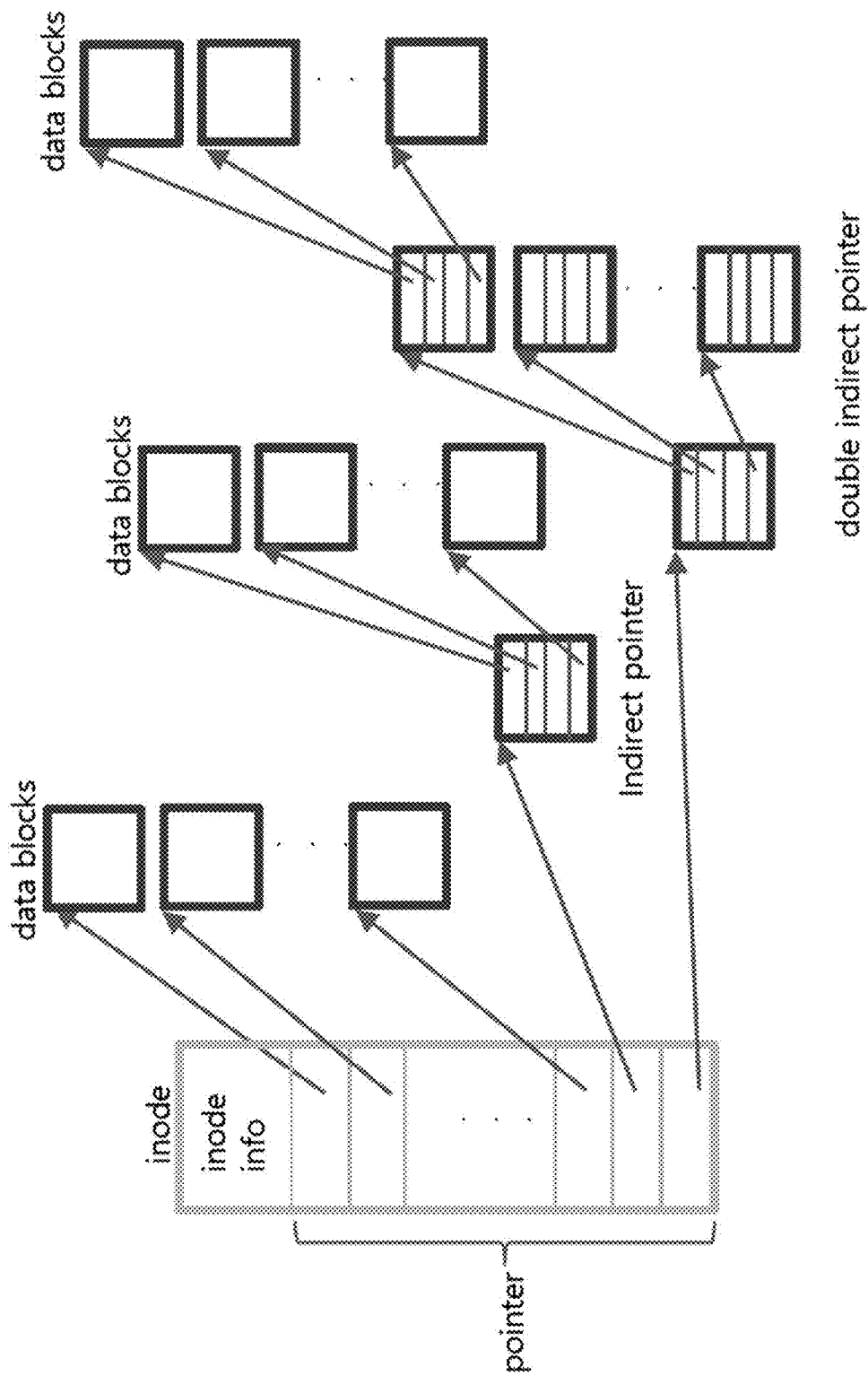
FIG. 10 illustrates a typical structure of an inode data block pointer.

When the new created inode is a directory, all directory entries are replicated in the same manner as described above. When the new crated inode is a file, the inode data block pointer structure of the old file that can access the actual data is replicated. In general, a file is stored in units of blocks or extents and the location information for accessing the stored data in the blocks or extents is structured in an inode, as shown in FIG. 10. That is, the actual data corresponding to a logical position of the file is stored in a block or an extent indicated by the data block pointer of the inode.

Figure 11:
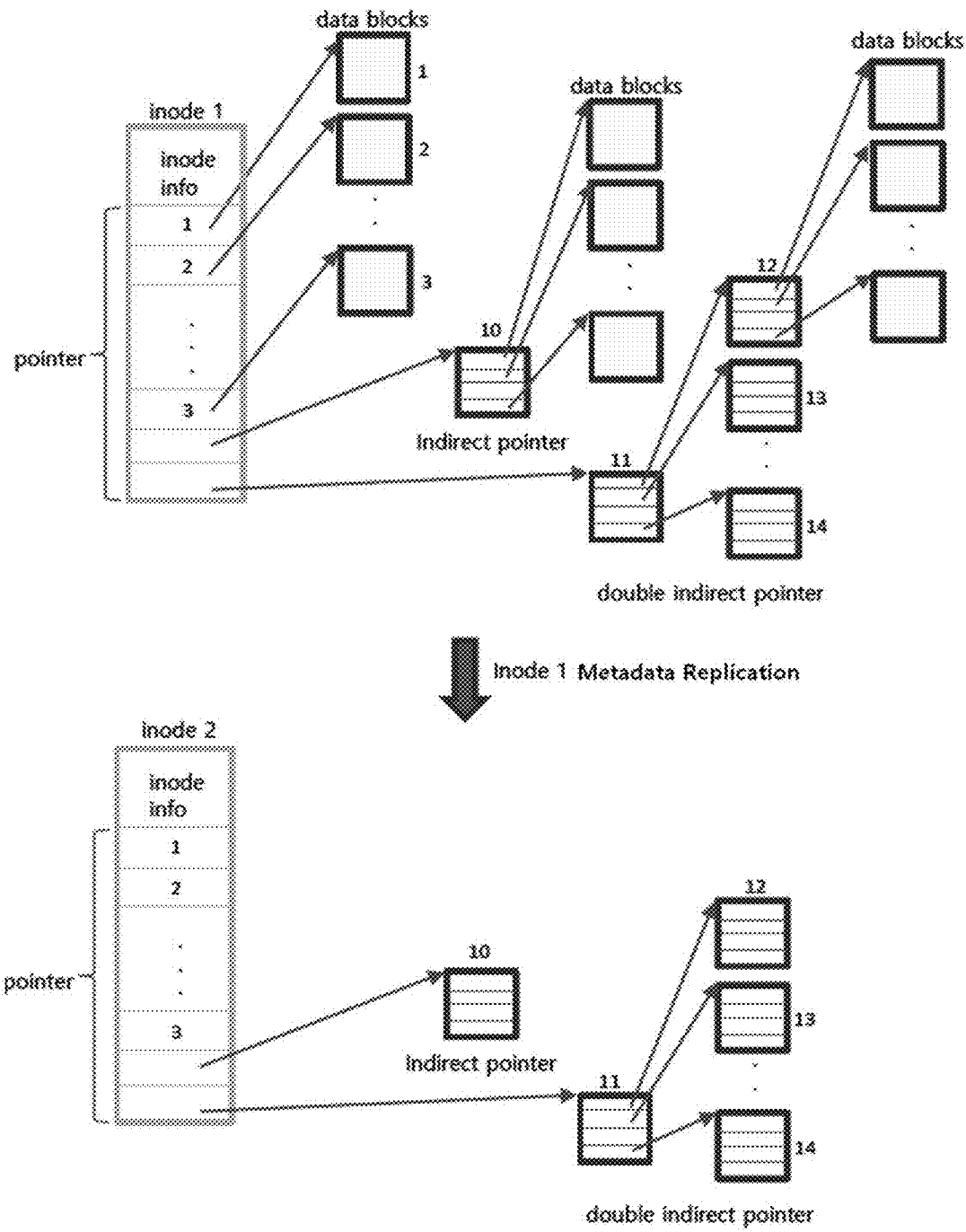
FIG. 11 illustrates replication of an inode data block pointer.

FIG. 11 shows a result obtained by replicating metadata of inode 1, which is an original inode, after generation of an inode 2 which is a new inode. A directory is also a type of file and treated in the same manner as the file.

The above-described directory replication process and CDP log record synthesis for each file are performed simultaneously by the data virtualization module and the snapshot module, respectively. When the above process is completed, the snapshot module completes the snapshot creation by reading the leaf node of the B+ tree created in the CDP log record synthesis process from left to right, and executing the operation indicated in the CDP log record on the snapshot structure created by the data virtualization module.

Each entry of the B+ tree leaf node includes chunk information which consists of the logical location of the data chunk in the file and location information of the actual data stored in a CDP log. During a CDP log record synthesis process, the logical position of data may be integrated with or separated from other entries. Thus, the logical location of the data indicated in an entry can consist of multiple data chunk information, which are linked in order of the logical location of the data chunk. All entries of the leaf node are also stored in the order of logical location, and the entry with the lowest logical location is located at the far left.

The snapshot module collects file chunk data from a corresponding CDP log record using the chunk information stored in the entry of the B+ tree leaf node corresponding to each file to complete creation of a snapshot. Then, the collected file chunk data is stored in the file by performing the operation in the same manner as performed in the service node. In the case, if a file is a newly created one, the file is created and the file data is stored in the file in the same manner as the service node. Otherwise, file data is stored as below.

The data virtualization module creates a new inode when a file or directory is changed and replicates all data block pointers of an original inode. Accordingly, data of an unchanged portion of the file may be accessed without duplicating file data of an actual portion using the replicated data block pointer as it is. However, when the file data is changed using a data block pointer of a changed portion as it is, the original file cannot be preserved because new data is overwritten on a previous file data.

Accordingly, there is need for a process of storing new data while preserving original file data. That is, a new data block (or extent) should be allocated to store changed file data chunks; a file data chunk should be stored in the block, and a data block pointer value corresponding to the changed portion should be changed to an address of the newly allocated block.

At this time, if a file data chunk size is smaller than the block size, the entire block data cannot be accessed. In this case, the data block indicated by the original data block pointer should be replicated to the newly allocated data block, and the file data chunk is stored in the data block in such a manner that the new data block can be accessed while preserving the original data block. When the file data chunk size matches the data block size, the original data block does not need to be replicated; the file data chunk is stored in the newly allocated data block, and the data block pointer is changed to the address of the data block. When the data block pointer is NULL, the file data chunk is stored in the same manner as the file data chunk size matches the data block size.

Figure 12:
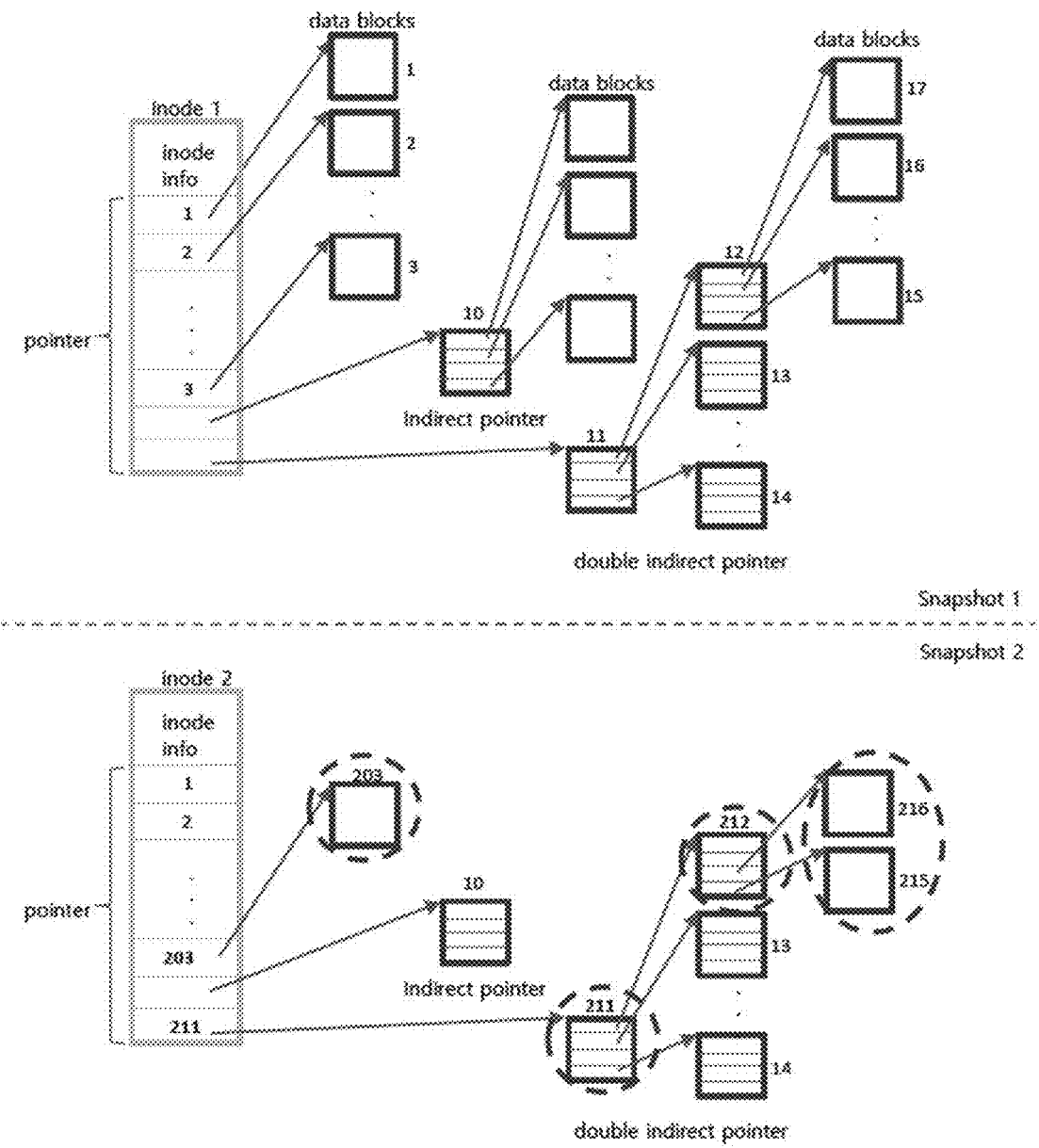
FIG. 12 illustrates modification of an inode data block pointer.

FIG. 12 schematically illustrates a result obtained by performing the above-described process. During generation of snapshot data, the data virtualization module recognizes that a file corresponding to inode 1 has been changed and replicates all metadata of inode 1 by allocating a new inode 2 as shown in FIG. 11. In the process of storing snapshot data from CDP logs in a snapshot, it is recognized that file data corresponding to blocks 3, 15, and 16 of the original file has been changed. Therefore, after allocation of a corresponding block 203, the data block pointer value is changed to the address of the newly allocated block (see Snapshot 2 in FIG. 12).

To complete creation of a snapshot, blocks 215 and 216 corresponding to the blocks 15 and 16, respectively, should be allocated, and changed file data should be stored in these blocks. However, since these data blocks are accessible through a double indirect pointer, each of all block pointer blocks on its path for accessing these blocks should be replicated to a new block, respectively, and a block pointer value should be changed to access the newly allocated block.

Data of the blocks 15 and 16 are changed to data of new allocated blocks 215 and 216, respectively. The new blocks cannot be accessed via block 12. Accordingly, after allocating a new block 212 and replicating data of block 12, block 212 should be changed to be accessible to blocks 215 and 216. Block 212 is a double indirect pointer block. Thus, a new block 211 is allocated to access block 212 and it should be modified after replication of the data in block 11. Finally, the block pointer value should be changed to be accessible to block 211 (see Snapshot 2 in FIG. 12).

A snapshot created using the above-described method is managed by the master copy module as an independent full copy at a certain point in time of the service node. Accordingly, the master copy module can always provide a full copy data of the service node data at an arbitrary point in time while physically storing a single copy of the service node data, which minimizes the storage usage.

The master copy module manages snapshots, the directory and file information associated with each snapshot, and range-based B+ tree information generated during a snapshot creation. Also the maser copy module deletes the above information at the time of snapshot deletion.

The master copy module may allow another server to mount directly arbitrary point-in-time full copy data according to a user's request, or may restore and use the full copy data to a storage desired by the user. Moreover, the point-in-time full copy data managed by the master copy module may be provided for test, analysis, and the like in the same manner as described above. Data created or changed during a test or analysis may also be managed according to the above-described procedure.

Additionally, the master copy module may generate and provide a full copy of service node data immediately before a service node failure to use the full copy in disaster recovery (DR) services. In the case of the service node failure, the master copy module requests the snapshot module to create a new snapshot and to deliver snapshot information to a creation result. The snapshot module receiving the request may generate snapshot data by synthesizing the CDP log records stored in the CDP pool, until immediately before the service node failure, and may create a with the data virtualization module together in the same method as described above. Also the snapshot module may deliver information on the snapshot to the master copy module. The snapshot created in such a manner is a full copy of data immediately before the service node failure and is referred to as a real-time copy (see FIG. 2). The master copy module may allow another server to mount and use arbitrary point-in-time full copy data according to a user's request, or may restore and use the full copy data to a storage desired by the user.

Snapshot Deletion Technology

The master copy module may clean up and delete snapshots created in the past according to a policy set by a user. In this case, information of a snapshot crated immediately after a deletion target snapshot, that is, a file and directory information associated with the snapshot and an range-based B+ tree generated during synthesis of snapshot data are used.

File and directory information, associated with each snapshot, managed by the master copy module means that the directories and files included in the information have been changed at the time of the snapshot creation. In contrast, a directory or a file, which is not included in this information, means that the directory or the file has not changed at all and shares data blocks with the just previous snapshot.

When a snapshot is created at $T_0$ and then another snapshot is created at $T_1$, the data virtualization module replicates a directory at $T_0$ snapshot and metadata of a changed file to the $T_1$ snapshot using the above-described method. Then, when the snapshot created at $T_0$ is deleted, $T_0$ snapshot is deleted using the snapshot information generated immediately after $T_0$, that is, the file and directory information associated with the snapshot at T1 and the range-based B+ tree.

Directories and files in the snapshot at $T_0$, which are not matched the file and directory information associated with the snapshot of $T_1$, have not been changed at all between $T_0$ and $T_1$. This means that when the snapshot at $T_1$ is created, only metadata of the $T_0$ snapshot is replicated to directly access the $T_1$ snapshot without replicating the file or directory data. Accordingly, the data blocks shared by T0 and T1 snapshots cannot be deleted through the metadata, only the metadata of the T0 snapshot can be deleted.

On the other hand, snapshot file and directory of $T_0$ matching the file and directory information associated with a snapshot of $T_1$ mean that they have been changed between $T_0$ and $T_1$, and mean that changed data blocks in addition to the metadata associated the data blocks may be deleted. This means that the inode data block pointer of the directory or file replicated from the T0 snapshot has changed, and that data block is no longer shared between the two snapshots, so it can be deleted from the T0 snapshot. Accordingly, the inode block pointer of the $T_0$ snapshot deletes a data block indicated by the block pointer that is not the same as the inode block pointer of the $T_1$ snapshot, and then deletes the inode.

A changed inode block pointer may be found using an range-based B+ tree of the $T_1$ snapshot and a corresponding data block may be deleted. Each entry in a range-based B+ tree leaf node denotes a changed logical position of a file. Accordingly, the $T_0$ snapshot may be deleted by deleting the file data block of the $T_0$ snapshot corresponding to each entry and deleting the metadata.

A snapshot may be deleted in the order of their creation in the manner described so far. However, in some cases, the user wants to delete any snapshot, which may also be simply deleted by a method described below.

It will be assumed that for example, a snapshot is created at $T_0$, a next snapshot is created at $T_1$, and the last snapshot is created at $T_2$, but the $T_1$ snapshot is deleted. In this case, the $T_1$ snapshot may share metadata and data with the $T_0$ snapshot and the $T_2$ snapshot at the same time, so that a sharing relationship between front-to-back snapshots should be determined to delete the metadata and data of the $T_1$ snapshot.

In the present disclosure, a data block of a $T_n$ snapshot is deleted using the range-based B+ tree of a $T_{n+1}$ snapshot. Each entry of a range-based B+ tree leaf node denotes a changed logical position of a file. For this reason, a file data block pointer corresponding to each entry may be easily found in a $T_{n-1}$ snapshot and the $T_n$ snapshot. When a pointer is different in two snapshots, a corresponding data block is deleted from the $T_n$ snapshot. When a point is not different, a corresponding data block is not deleted. Through the above procedure, a determination is made as to whether data blocks corresponding to all entries of the range-based B+ tree of the $T_{n+1}$ snapshot are identical in the $T_{n-1}$ snapshot and the $T_n$ snapshot. Thus, all the data blocks which may be deleted from the $T_n$ snapshot may be found and deleted. Then, deletion of the $T_n$ snapshot may be completed by deleting the metadata and deleting the inode.

Snapshot Replication Technology

Each snapshot managed by the master copy module is full copy data of arbitrary point in time. A CDM system may simply replicate a snapshot, without replicating actual data, according to the purpose of a test or analysis depending on a user's request to provide a full copy of a user-desired point in time.

The replicated snapshot is provided as a read-only or updatable snapshot, and the updateable snapshot is created in the same manner as a normal snapshot data management according to a user-defined data management policy with the help of a data management policy module.

CDM System

Figure 13:
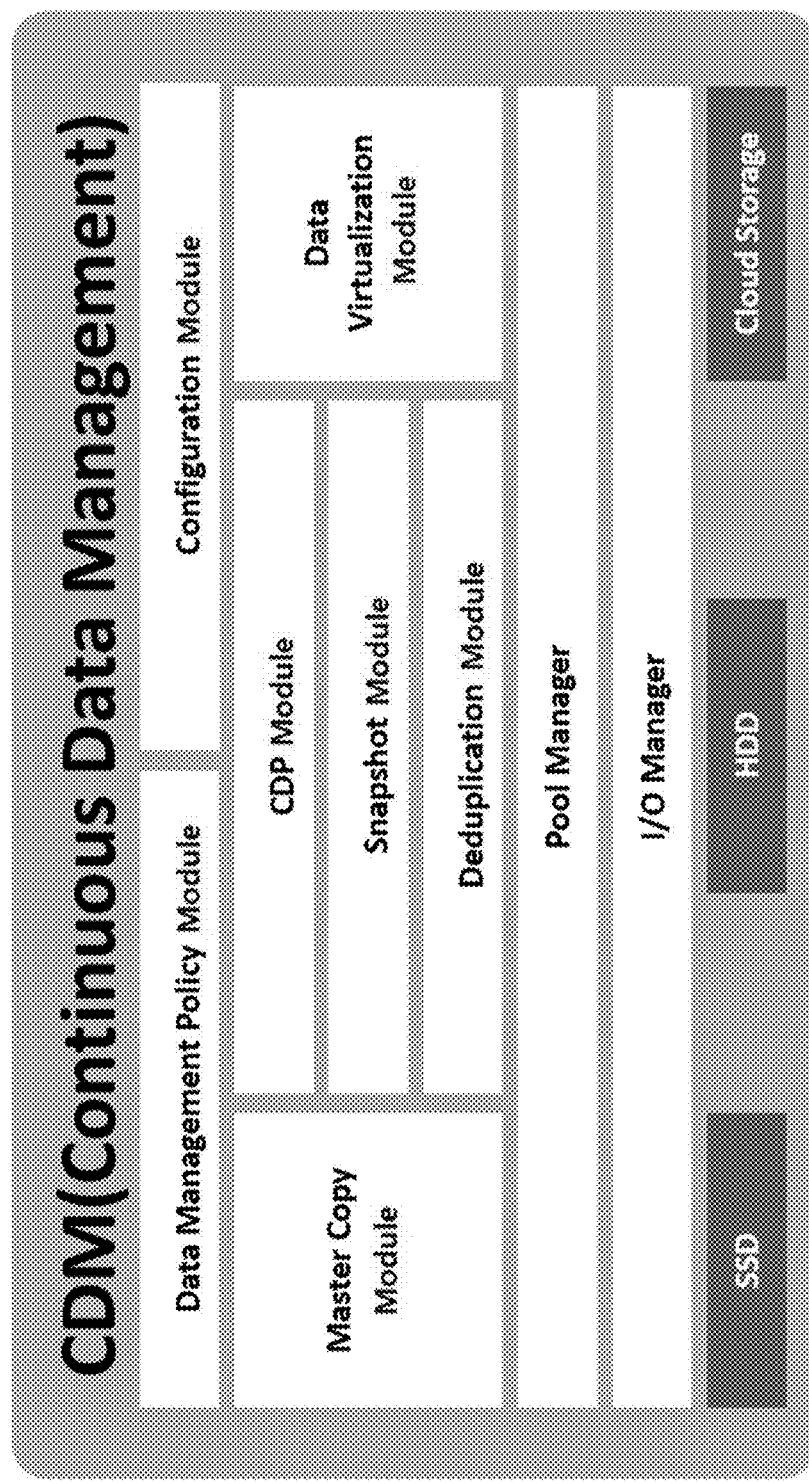
FIG. 13 is a block diagram of a higher-level DCM system.

FIG. 13 is a high-level block diagram of a CDM system configured to implement the above-described operations. In the present disclosure, the CDM system is connected to service nodes through a network. All service nodes connected to the network are searched and listed by a configuration module of the CDM system and provide an accessible means by registering a service node which requires data management. The configuration module is responsible for connection and HA between CDM systems.

Then, the data management policy module provides a means for selecting a data set which needs to be managed among data of the service node and setting a management policy for the data set. The data management policy includes a CDP-required period, CDP log replication to another CDM system, snapshot creation and retention period, a data deduplication and deduplication data retention policy, and the like.

The data management policy module includes a scheduler function and transmits a command to another module to execute a data management policy set by an administrator at a required time. After the CDP-required period elapses, a command is transmitted to the snapshot module to clean up CDP log records collected and managed by the CDP module during the CDP-required period and actions are taken to store a new CDP log record. A command is also transmitted in such a manner that a snapshot is created by cleaning up the CDP log record in time for a snapshot creation cycle.

A main role of the CDP module is to store and manage data transmitted from a CDM agent of a service node, in a log form by file in a CDP pool so that other modules, such as the snapshot module and the like, of the CDM system provide a integral data management service based on the data stored in the CDP log. In addition, the CDP module may replicate a CDP log record to another or a remote CDM system according to a predetermined configuration of the configuration module to provide a data management service according to a user's request.

A main role of the snapshot module is to receive commands from the data management policy module, clean up the CDP log record, and create a snapshot with the data virtualization module. The snapshot module simply creates a snapshot in a short period of time, based on the data stored in the CDP log record, but the created snapshot is a full copy of the service node at a specific point in time and is the same as a backup version of entire service node data at a point of creating a snapshot. That is, full copy data at a specific point in time may always be provided, without duplication of actual data, to significantly reduce time and cost for providing full copy data.

The data virtualization module plays a role in replicating metadata in the CDM system of management target data according to a request of the snapshot module or a deduplication module or modifying the metadata, if necessary, to provide data virtualization.

The master copy module registers and manages an initial copy and a snapshot, which is full copy data of the service node at a specific point in time. The master copy module may clean up and delete snapshots according to a request of the data management policy module, and a snapshot may be replicated to be provided to a user according to the user's request. The master copy module may be used to mount the snapshot directly from another server according to the user's request or restore it to the storage desired by the user. The master copy module may allow another server to mount and use a snapshot according to a user's request, or may restore and use the snapshot to a storage that the user requires.

The deduplication module splits the initial copy and the snapshot data in chunks and stores only deduplicated in a deduplication pool. Data stored in a file of the deduplication pool is chunk information of actual file data. The actual chunk data is stored in a separate repository, and an access to the chunk data stored in the repository may be performed using a fingerprint table.

The chunk repository is a repository in which actual chunk data is stored. The chunk repository may be managed by being separately allocated to the deduplication pool or may be used without replicating an initial copy and snapshot data. Alternatively, an external storage may be used and the initial copy and the snapshot data may be replicated to another CDM device to store deduplicated data.

An input/output (I/O) manager plays a role in integrally managing an SSD and an HDD of each CDM system and providing a global storage in connection with an external storage such as SAN/NAS and a cloud. A pool manager provides a storage pool required by each module of the CDM system to a global storage provided by the I/O manager.

Depending on example embodiments of the present disclosure, steps and/or operations in accordance with the present disclosure may occur in a different order, or in parallel, or concurrently for different epochs, and the like, in different embodiments, as would be understood by one of ordinary skill in the art.

Depending on example embodiments, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware (or embedded software), hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present disclosure may include, without limitation, application-specific integrated circuits (ASICs), standard integrated circuits, controllers executing appropriate instructions (including microcontrollers and/or embedded controllers), field-programmable gate arrays (FPGAs), complex programmable logic devices (CPLDs), and the like.

Although the present disclosure and its advantages have been described in detail, it should be understood that various changes, substitutions and alterations can be made herein without departing from the spirit and scope of the disclosure as defined by the following claims.

What is claimed is:

1. An operating method of a continuous data management (CDM) system, the operating method comprising:
   selecting, by a data management policy module, management target data among data of a service node;
   setting, by the data management policy module, a data management policy for the management target data,
   duplicating, by a continuous data protection (CDP) module, changed data of the management target data in real time in units of input/output (I/O) system calls in the form of a journal for a CDP period set by the data management policy; and
   integrally managing, by the data management policy module, the data of the service node, based on the duplicated data,
   wherein the duplicating changed data comprises:
   receiving a directory snapshot of the service node, created by a CDM agent on the service node, after setting the data management policy,
   wherein the directory snapshot includes a directory structure for the selected data of the service node according to the data management policy and hard links of files included in each directory,
   wherein the CDM agent scans the hard links of the directory snapshot to generate a storage extent/block map of the service node mapped to a logical address of file data, aligns the storage extent/block map based on a physical address, and transmits the aligned extent/block map to the CDM system, and
   wherein the duplicating changed data of a service node in real time further comprises:
   allowing the CDM agent to read extents/blocks aligned based on a physical address from a storage of the service node in the order of physical addresses and to transmit the extents/blocks to the CDM system; and
   completing primary initial synchronization of the selected data of the service node, by a master copy module replicating the directory structure of the directory snapshot, and then replicating all extents/blocks transmitted by the service node on the directory structure using the extent/block map of the service node mapped to the logical address of the file data.

2. The operating method as set forth in claim 1, wherein the duplicating changed data further comprises:
   transmitting a file system structure or data change history of the service node to the CDM system using the delta technology and storing the changed data in the form of a log in a CDP pool by the CDP module while simultaneously performing initial synchronization of the service node; and
   reflecting log records stored in the CDP module by a snapshot module to create an initial copy completely on data where the initial synchronization is completed with the extent/block map.

3. An operating method of a continuous data management (CDM) system, the operating method comprising:
   selecting, by a data management policy module, management target data among data of a service node;
   setting, by the data management policy module, a data management policy for the management target data,
   duplicating, by a continuous data protection (CDP) module, changed data of the management target data in real time in units of input/output (I/O) system calls in the form of a journal for a CDP period set by the data management policy; and integrally managing, by the data management policy module, the data of the service node, based on the duplicated data, wherein the duplicating changed data of a service node in real time comprises:

receiving input/output system call information and its associated data transmitted from a CDM agent of the service node after creating an initial copy;

adding time information to the received system call information to generate time added information and separating the time added information by file; and storing the separated time added information in a CDP pool in the form of a log to perform data recovery in the units of I/O system calls, where all CDP log records are linked by file.

4. The operating method as set forth in claim 3, wherein the integrally managing data comprises:

recovering data in the units of I/O system calls by file by performing an operation that is associated with a CDP log record and executed on the service node; or generating whole service node data, at a point in time required by a user, in the CDM system.

5. An operating method of a continuous data management (CDM) system, the operating method comprising:

selecting, by a data management policy module, management target data among data of a service node;

setting, by the data management policy module, a data management policy for the management target data, duplicating, by a continuous data protection (CDP) module, changed data of the management target data in real time in units of input/output (I/O) system calls in the form of a journal for a CDP period set by the data management policy; and integrally managing, by the data management policy module, the data of the service node, based on the duplicated data, wherein the changed data is duplicated in real time in the form of a journal in a CDP pool, and snapshot data is generated by reflecting a type of operation associated with each CDP log record by file stored in minutes, and wherein among operations for a file, a CDP log record synthesis for each file is performed to include only a non-overlapping data portion in the snapshot data using a start location and an end location of data in a file associated with each CDP log record as a key of B+ tree.

6. The operating method as set forth in claim 5, wherein if a previously inserted range and a newly inserted range are contiguous when an adjusted key is inserted into a leaf node of the B+ tree, two contiguous keys are merged into a new key, and a previously inserted key is replaced by the new key.

7. An operating method of a continuous data management (CDM) system, the operating method comprising:

selecting, by a data management policy module, management target data among data of a service node;

setting, by the data management policy module, a data management policy for the management target data, duplicating, by a continuous data protection (CDP) module, changed data of the management target data in real time in units of input/output (I/O) system calls in the form of a journal for a CDP period set by the data management policy; and integrally managing, by the data management policy module, the data of the service node, based on the duplicated data, wherein a data virtualization module of the CDP system creates a structure required to generate snapshot data before a snapshot module synthesizes CDP log records for each file, wherein the data virtualization module uses an initial copy when a snapshot is created for the first time and then creates the structure required to create the snapshot data by replicating a directory structure from a topmost directory of the last created snapshot, wherein the data virtualization module replicates all directory entries one by one using the file and directory information generated by the CDP module while replicating directory entries, and wherein, if an entry name of a directory entry is the same as the file and directory information, it is determined that some operations for the directory entry occurred during the CDP period, and thus a new inode is generated to replace an original entry to protect the original entry and new metadata is generated to store the changed data.

8. The operating method as set forth in claim 7, wherein the data virtualization module replicates the directory entry to access data without replicating actual data to a currently created snapshot because no operation for the directory entry has occurred during the CDP period when the entry name of the directory entry is different from the file and directory information.

9. The operating method as set forth in claim 7, wherein the data virtualization module replicates directory entries if the new inode is a directory and duplicates an inode data block pointer structure that is positional meta data in which the actual data is stored so that the actual data is accessed if the new inode is a file.

10. The operating method as set forth in claim 7, wherein the snapshot data is managed as an independent full copy at an arbitrary point in time of the service node by a master copy module.

11. The operating method as set forth in claim 10, wherein the master copy module generates and provides a full copy for the data of the service node, immediately before a failure of the service node occurs, such that the full copy is used in disaster recovery (DR) services.

12. The operating method as set forth in claim 10, wherein the master copy module deletes, replicates, or deduplicates the snapshot data according to a policy set by a user.

13. A data service system comprising:

a plurality of service nodes at which changed data of a service node is transmitted to a continuous data management (CDM) by a CDM agent of the service node; and a CDM system configured to duplicate the changed data of the service node in real time in the form of a journal in units of input/output (I/O) system calls for a continuous data protection (CDP) period set by a data management policy to recover management target data of the service node by file; and wherein the CDM system generates a snapshot, which is the same with a full copy of the management target data of the service node at a specific point in time, set by the data management policy using only the duplicated data for the CDP period without affecting the service node, wherein the CDM system includes a data management policy module configured to integrally manage data of the service node based on the duplicated data, and wherein the data management policy module selects the management target data among the data of the service node and sets the data management policy for the selected data, the changed data corresponding to the management target data, wherein the CDM system receives input/output data and system call information transmitted from the CDM agent of the service node after creating an initial copy, adds the received information to time information for each file in the units of I/O system calls, and stores the time added information in a CDP pool in the form of a log to recover data in the units of I/O system calls.

* * * * *